(12) United States Patent
Itskovich et al.

(10) Patent No.: US 7,994,790 B2
(45) Date of Patent: *Aug. 9, 2011

(54) ELECTROMAGNETIC AND MAGNETOSTATIC SHIELD TO PERFORM MEASUREMENTS AHEAD OF THE DRILL BIT

(75) Inventors: Gregory B. Itskovich, Houston, TX (US); Roland E. Chemali, Humble, TX (US); Tsili Wang, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 225 days.

This patent is subject to a terminal disclaimer.

(21) Appl. No.: 12/401,440

(22) Filed: Mar. 10, 2009

(65) Prior Publication Data

US 2009/0237084 A1 Sep. 24, 2009

Related U.S. Application Data

(60) Provisional application No. 61/037,930, filed on Mar. 19, 2008.

(51) Int. Cl.
*G01V 3/08* (2006.01)
*G01V 3/10* (2006.01)

(52) U.S. Cl. .................................. 324/338; 324/339
(58) Field of Classification Search .......... 324/338–339
See application file for complete search history.

(56) References Cited

U.S. PATENT DOCUMENTS

| | | | |
|---|---|---|---|
| 4,700,142 A | 10/1987 | Kuckes | |
| 5,452,761 A | 9/1995 | Beard et al. | |
| 6,646,441 B2 | 11/2003 | Thompson et al. | |
| 6,901,521 B2 | 5/2005 | Chauvel et al. | |
| 7,046,009 B2 | 5/2006 | Itskovich | |
| 7,150,316 B2 | 12/2006 | Itskovich | |
| 7,167,006 B2 | 1/2007 | Itskovich | |
| 2003/0184303 A1 | 10/2003 | Homan et al. | |
| 2007/0216416 A1 | 9/2007 | Itskovich | |

*Primary Examiner* — Reena Aurora
(74) *Attorney, Agent, or Firm* — Mossman Kumar & Tyler PC (57) ABSTRACT

A transmitter on a bottomhole assembly (BHA) is used for generating a transient electromagnetic signal in an earth formation. A pair of receivers on the BHA receive signals that are indicative of formation resistivity and distances to bed boundaries. A time dependent calibration factor or a time-independent calibration factor may be used to combine the two received signals and estimate the distance to bed boundaries that are unaffected by the drill conductive body. Further improvement can be obtained by using copper shielding.

17 Claims, 11 Drawing Sheets

ELECTROMAGNETIC AND MAGNETOSTATIC SHIELD TO PERFORM MEASUREMENTS AHEAD OF THE DRILL BIT

CROSS-REFERENCES TO RELATED APPLICATIONS

This application claims priority from U.S. Provisional Patent Application Ser. No. 61/037,930 filed on Mar. 19, 2008.

BACKGROUND OF THE DISCLOSURE

1. Field of the Disclosure

The disclosure relates to the field of electromagnetic induction well logging. More specifically, the present disclosure is a method of reducing effects of conductive drill pipes on signals in transient electromagnetic measurements for evaluation of earth formations ahead of the drill bit.

2. Description of the Related Art

Electromagnetic induction resistivity instruments can be used to determine the electrical conductivity of earth formations surrounding a wellbore. An electromagnetic induction well logging instrument is described, for example, in U.S. Pat. No. 5,452,761 issued to Beard et al. The instrument described in the Beard '761 patent includes a transmitter coil and a plurality of receiver coils positioned at axially spaced apart locations along the instrument housing. An alternating current is passed through the transmitter coil. Voltages that are induced in the receiver coils as a result of alternating magnetic fields induced in the earth formations are then measured. The magnitude of certain phase components of the induced receiver voltages are related to the conductivity of the media surrounding the instrument.

Deep-looking electromagnetic tools are used to achieve a variety of different objectives. Deep-looking tools attempt to measure the reservoir properties between wells at distances ranging from tens to hundreds of meters (ultra-deep scale). There are single-well and cross-well approaches, most of which are rooted in the technologies of radar/seismic wave propagation physics. This group of tools is naturally limited by, among other things, their applicability to only high-resistivity formations and the power available downhole.

At the ultra-deep scale, technology may be employed based on transient field behavior. The transient electromagnetic field method has been used in surface geophysics. Typically, voltage or current pulses that are excited in a transmitter initiate the propagation of an electromagnetic signal in the earth formation. Electric currents diffuse outwards from the transmitter into the surrounding formation. At different times, information arrives at the measurement sensor from different investigation depths. Particularly, at a sufficiently late time, the transient electromagnetic field is sensitive mainly to remote formation zones and only slightly depends on the resistivity distribution in the vicinity of the transmitter. This transient field is especially important for logging.

The transmitter may be either a single-axis or multi-axis electromagnetic and/or electric transmitter. In one embodiment, the transient electromagnetic (TEM) transmitters and TEM receivers are separate modules that are spaced apart and interconnected by lengths of cable, with the TEM transmitter and TEM receiver modules being separated by an interval of from one meter up to 200 meters, as selected. Radial depth of investigation $\delta$ is related to time by the relation $\delta = \sqrt{2t/\sigma\mu}$. Thus, the depth of investigation increases with time t. Similarly, the conductivity $\sigma$ of the surrounding material inversely affects the depth of investigation $\delta$. As conductivity $\sigma$ increases, the radial depth of investigation decreases. Finite conductivity casing of the apparatus, therefore, can reduce the radial depth of investigation.

Rapidly emerging measurement-while-drilling (MWD) technology introduces a new, deep (3-10 meters) scale for an electromagnetic logging application related to well navigation in thick reservoirs. The major problem associated with the MWD environment is the introduction of a metal drill pipe close to the area being measured. This pipe produces a very strong response and significantly reduces the sensitivity of the measured EM field to the effects of formation resistivities and remote boundaries. Previous solutions for this problem typically comprise creating a large spacing (up to 20 meters) between transmitter and receiver. However, the sensitivity of such a tool to remote boundaries is low.

In a typical transient induction tool, current in the transmitter coil drops from an initial value $I_0$ to 0 at the moment $t=0$. Subsequent measurements are taken while the rotating tool is moving along the borehole trajectory. The currents induced in the drilling pipe and in the formation (i.e., eddy currents) begin diffusing from the region close to the transmitter coil in all directions surrounding the transmitter. These currents induce electromagnetic field components that can be measured by induction coils placed along the conductive pipe. Signal contributions due to the eddy currents in the pipe are considered to be parasitic since the signal due to these eddy currents is much stronger than the signal from the formation. In order to receive a signal that is substantially unaffected by the eddy currents in the pipe, one can measure the signal at the very late stage, at a time when the signals from the formation dominate parasitic signals due to the pipe. Although the formation signal dominates at the late stage, it is also very small, and reliable measurement can be difficult. In prior methods, increasing the distance between transmitter and receivers reduces the influence of the pipe and shifts the dominant contribution of the formation to the earlier time range. Besides having limited resolution with respect to an oil/water boundary, such a system is very long (up to 10-15 m) which is not desirable and/or convenient for an MWD tool.

U.S. Pat. No. 7,150,316 to Itskovich, having the same assignee as the present disclosure and the contents of which are incorporated herein by reference, teaches an apparatus for use in a borehole in an earth formation and a method of using the apparatus. A tubular portion of the apparatus includes a damping portion for interrupting a flow of eddy currents. A transmitter positioned within the damping portion propagates a first transient electromagnetic signal in the earth formation. A receiver positioned within the damping portion axially separated from the transmitter receives a second transient electromagnetic signal indicative of resistivity properties of the earth formation. A processor determines from the first and second transient electromagnetic signals a resistivity of the earth formation. The damping portion includes at least one cut that may be longitudinal or azimuthal. A non-conductive material may be disposed within the cut. Alternatively, the damping portion may include segments having cuts and segments having a non-conducting material on an outer surface thereof.

U.S. patent application Ser. No. 11/682,381 of Itskovich having the same assignee as the present disclosure and the contents of which are incorporated herein by reference discloses a combination of electromagnetic and magnetostatic shielding to perform measurements ahead of the drill bit. It has been found that the device of Itskovich provides the ability to determine a distance to an interface in the earth formation in which the borehole is inclined at angles of less than 45° to the interface. The term "interface" is intended to include a boundary between two fluids in an earth formation and also a boundary between different layers of the earth formation. At larger inclinations, the resistivity sensor may be considered to be "looking ahead of the drill" and the ability to identify interfaces 10 m ahead of the bottomhole assembly is relatively poor. These larger angles are commonly encountered when first drilling into a reservoir. Itskovich '381 shows that a combination of electromagnetic and magnetostatic shielding provides improved results. In the present disclosure, we discuss further development of the methods of Itskovich and Itskovich '381.

SUMMARY OF THE DISCLOSURE

One embodiment of the disclosure is a method of using an electromagnetic instrument in a borehole in an earth formation. The method includes changing a current through a transmitter on an electromagnetic instrument in a borehole and inducing a current in the earth formation; receiving a first transient signal resulting from the induced current in a first receiver and a second transient signal in a second receiver on the instrument, the first transient signal and the second transient signal including effects of a conductive body of the instrument; and using the first signal and the second signal for estimating a distance to an interface in the earth formation, the estimating being substantially unaffected by the conductive body.

Another embodiment of the disclosure is an apparatus configured to evaluate an earth formation. The apparatus includes an electromagnetic instrument having a conductive body configured to be conveyed in a borehole; at least one processor configured to change a current in a transmitter on the instrument; a first receiver configured to receive a first transient signal resulting from current induced in the formation responsive to the change in current in the transmitter; and a second receiver configured to receive a second transient signal resulting from the induced current; wherein the first signal and the second signal include effects of the conductive body and wherein the at least one processor is further configured to estimate a distance to an interface in the earth formation, the estimation being substantially unaffected by the conductive body.

Another embodiment of the disclosure is a computer-readable medium accessible to at least one processor. The computer-readable medium includes instructions which enable the at least one processor to estimate a distance to an interface in an earth formation using: a first transient signal in a first receiver resulting from an induced current in the earth formation produced by a transient signal in a transmitter on an electromagnetic instrument; and a second transient signal in a second receiver resulting from the induced current; wherein the first transient signal and the second transient signal including effects of a conductive body of the instrument and wherein the estimate is substantially unaffected by the conductive body.

BRIEF DESCRIPTION OF THE DRAWINGS

The present disclosure is best understood with reference to the attached drawings in which like numerals refer to like elements, and in which.

DESCRIPTION OF PREFERRED EMBODIMENTS

Figure 1:
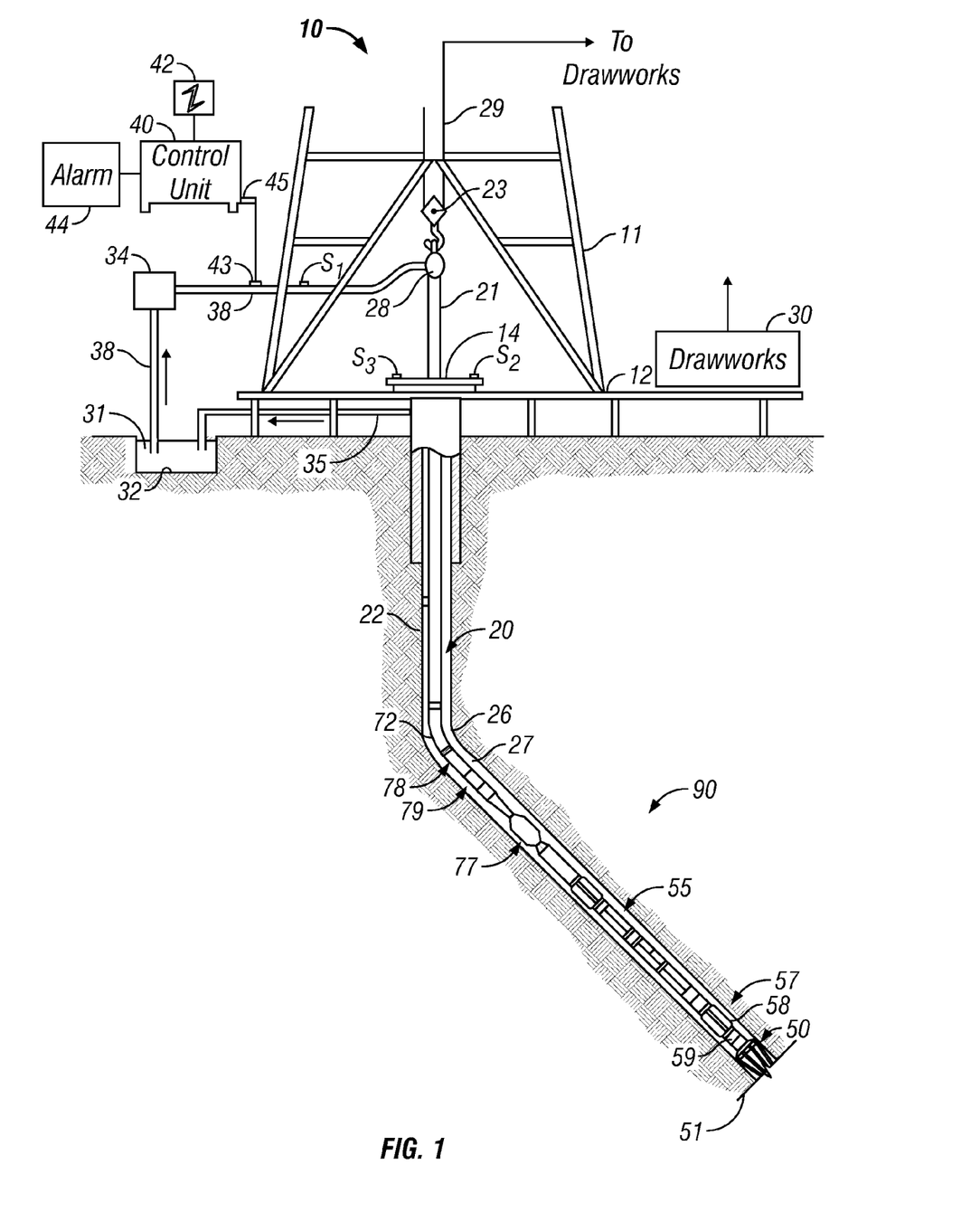
FIG. 1 shows a measurement-while-drilling (MWD) tool suitable for use with the present disclosure.

FIG. 1 shows a schematic diagram of a drilling system 10 with a drillstring 20 carrying a drilling assembly 90 (also referred to as the bottomhole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 28 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ preferably placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the present disclosure, the drill bit 50 is rotated by only rotating the drill pipe 22. In another embodiment of the disclosure, a downhole motor 55 (mud motor) is disposed in the drilling assembly 90 to rotate the drill bit 50 and the drill pipe 22 is rotated usually to supplement the rotational power, if required, and to effect changes in the drilling direction.

In one embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the disclosure, a drilling sensor module 59 is placed near the drill bit 50. The drilling sensor module contains sensors, circuitry and processing software and algorithms relating to the dynamic drilling parameters. Such parameters preferably include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 preferably includes a computer or a microprocessor-based processing system, memory for storing programs or models and data, a recorder for recording data, and other peripherals. The control unit 40 is preferably adapted to activate alarms 44 when certain unsafe or undesirable operating conditions occur. Not shown in FIG. 1 are details about the logging tool of the present disclosure, discussed below.

Figure 2:
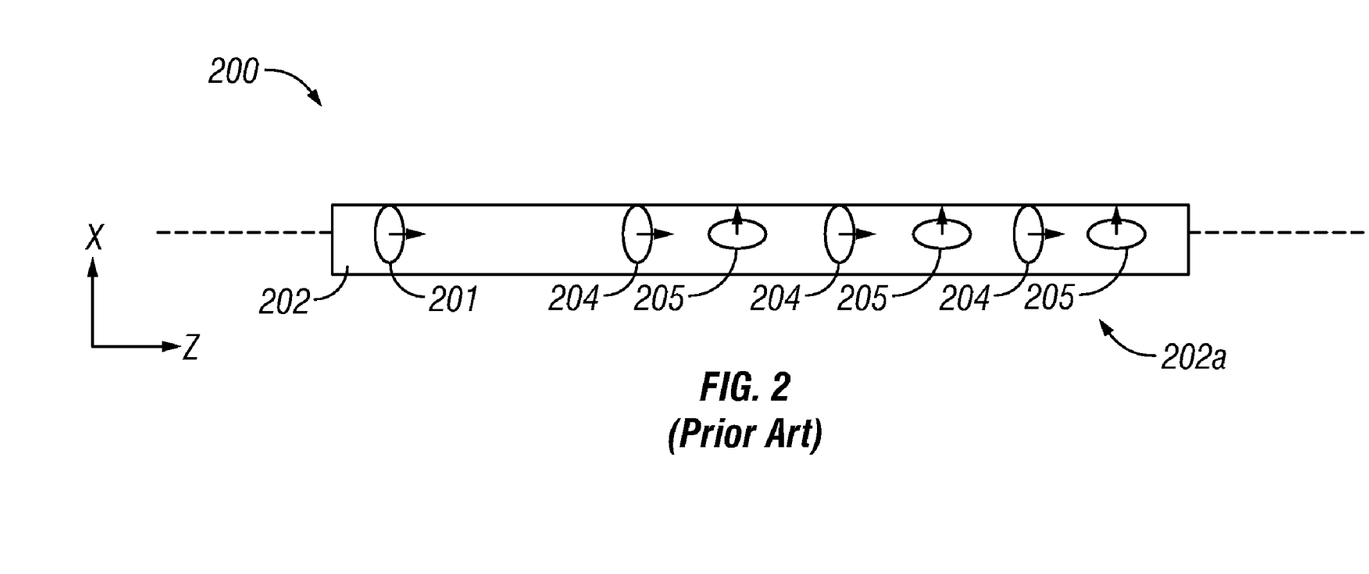
FIG. 2 (prior art) shows a schematic of an illustrative embodiment of the MWD tool of FIG. 1 and its trajectory in a horizontal well.

FIG. 2 shows the exemplary logging tool 200 of Itskovich suitable for use in a BHA in various illustrative embodiments of the present disclosure. A transmitter coil 201 and a receiver coil assembly 204, 205 are associated with a damping portion 202 of a drill pipe 202a by being positioned along the damping portion 202 of the drill pipe 202a for suppressing eddy currents. The longitudinal axis of the logging tool 200 defines a Z-direction of a coordinate system. An X-direction is defined so as to be perpendicular to the longitudinal axis of the logging tool 200. The damping portion 202 of the drill pipe 202a is of a length sufficient to interrupt a flow of eddy currents. Transmitter coil 201 is capable of inducing a magnetic moment. In the illustration of FIG. 2, for instance, the transmitter coil 201 is oriented to induce a magnetic moment along the Z-direction. The receiver coil assembly 204, 205 comprises an array of the Z-oriented coils 204 and the X-oriented coils 205 having magnetic moments oriented so as to be capable of detecting induced magnetic moments along orthogonal directions (i.e., $M_z$ and $M_x$, respectively). With a conductive drill pipe 202a without a damping portion 202, eddy currents produced in transient electromagnetic field measurements can make circumferential circuits coinciding with the drill pipe 202a surface. The eddy currents produced from a Z-transmitter, such as the Z-oriented transmitter coil 201 in FIG. 2, can exist for a long time and typically have the longest possible rate of decay of all transient electromagnetic signals. Longitudinal cuts disposed in the damping portion 202 force the eddy currents to follow one or more high resistivity paths instead of circumferential circuits, thereby inducing a quicker rate of decay of the eddy currents. Inducing a fast decay of the eddy currents in the drill pipe 202a enables improved measurements of the transient electromagnetic signal components. Such improvements enable improved determination of information, for instance, about positions of oil/water boundaries and/or resistivity of the surrounding earth formation.

Although FIG. 2 illustrates one configuration of the transmitter 201 and receiver(s) 204, 205, a variety of transmitter-receiver configurations can be used in various illustrative embodiments of the present disclosure. In a first embodiment of the MWD transient tool 200, the Z-oriented transmitter coil 201 can be positioned along the damping portion 202, and a receiver coil pair 205-204 comprising an X-oriented coil 205 and a Z-oriented receiver coil 204 may be axially displaced from the Z-oriented transmitter coil 201. The receiver pair 205-204 may typically be placed at a distance of from about 0 m to about 10 m from the transmitter coil 201, also along the damping portion 202. A transmitter-receiver distance less than approximately 2 m from the transmitter coil 201 may further enable geosteering. The term geosteering refers to control of the drilling direction of the BHA based upon determined distances from an interface in the earth formation. Typically, in geosteering, it is desirable to maintain the drilling of the borehole at a desired depth below a fluid interface such as an oil/water, gas/oil, or gas/water interface. Alternatively, geosteering may be used to maintain the wellbore within a reservoir rock at a desired distance from the caprock.

As noted above, Itskovich discloses the use of damping for interrupting the flow of eddy currents induced in a member of the BHA, such as a tubular like the drill pipe 202a. The damping portion 202 of the drill pipe 202a of the present illustrative embodiment has longitudinal cuts of sufficient length to interrupt the flow of eddy currents, in this case, about 10 m in length. The transmitter-receiver pair 201-205-204 may be placed centrally in the damping portion 202 of the drill pipe 202a. As an alternative to cuts, such as longitudinal cuts, disposed in the member of the BHA, such as the tubular like the drill pipe 202a, a ferrite coating may be provided on the member of the BHA, such as the tubular like the drill pipe 202a. The use of cuts or a non-conducting ferrite coating may be referred to as magnetostatic shielding. Itskovich also teaches the use of a ferrite coating to provide magnetostatic shielding.

Figure 3:
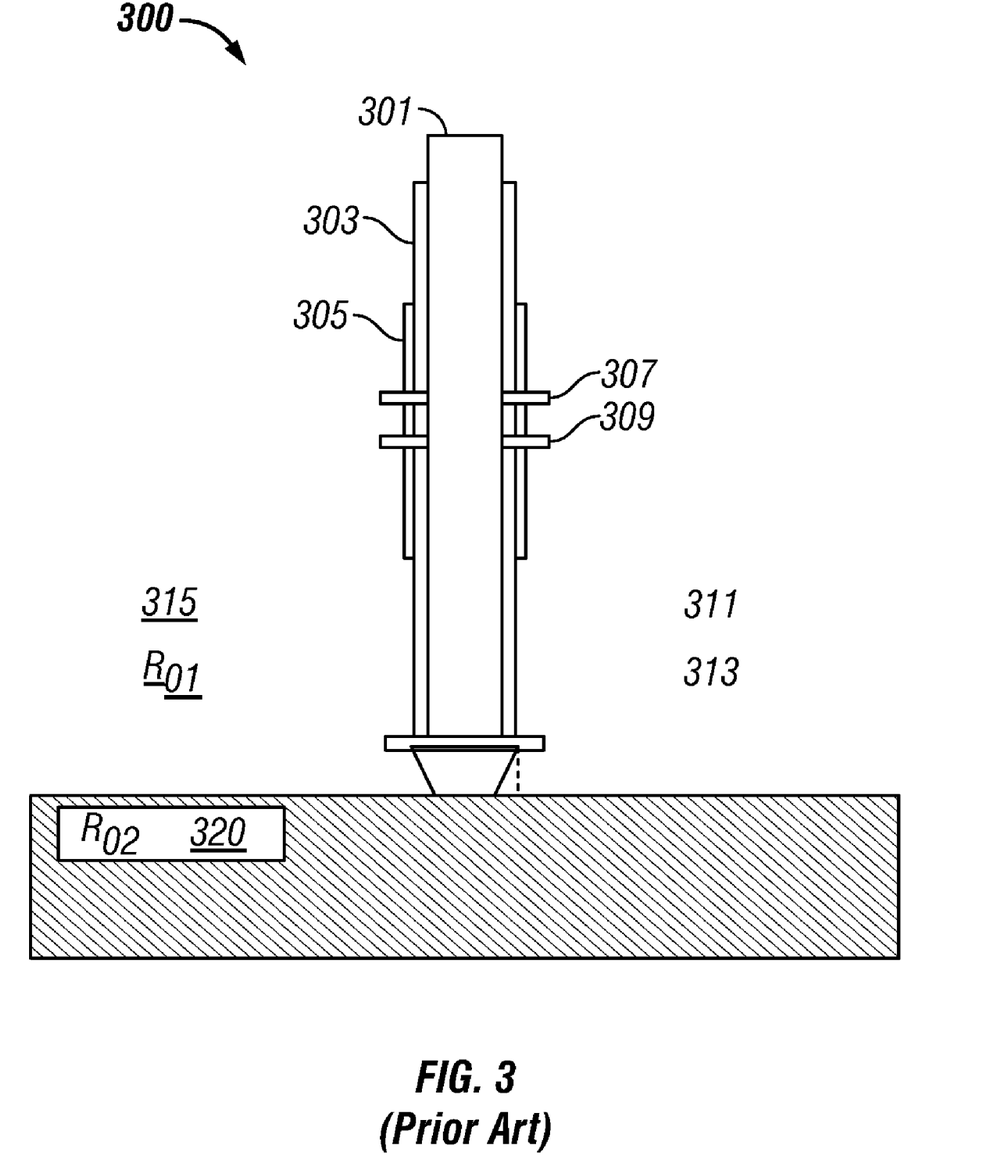
FIG. 3 (prior art) shows a schematic vertical-section of an illustrative embodiment of the MWD tool of the present disclosure with a bed boundary ahead of the drill bit.

In addition to magnetostatic shielding, various illustrative embodiments of the present disclosure may also include electromagnetic shielding. This is schematically illustrated in FIG. 3. Shown therein is an MWD tool of Itskovich '381 300 having a drill collar 301. The transmitter is indicated by 307 while the receiver is indicated by 309. The drill collar 301 may be provided with a magnetostatic shield 305. In addition to the magnetostatic shield 305, the drill collar 301 may also be provided with an electromagnetic shield 303. The electromagnetic shield 303 may be made of a highly conductive material such as copper. The potential use of an electromagnetic shield 303 was recognized upon reviewing the differences between wireline and MWD resistivity measurement techniques. As noted in U.S. Pat. No. 6,906,521 to Tabarovsky et al., having the same assignee as the present disclosure, the contents of which are incorporated herein by reference, an MWD apparatus that includes a perfectly conducting mandrel acts in much the same way as a perfectly non-conducting logging tool body used in wireline applications. Methods developed over the years for wireline applications could then be used with little modification to MWD applications. One point of novelty in Tabarovsky may lie in the recognition of a problem caused by an imperfectly conducting mandrel and the development of a processing method to deal with the effects of an imperfectly conducting mandrel. The addition of a copper sheet as an electromagnetic shield 303 may, in various illustrative embodiments of the present disclosure, be viewed as a hardware solution to the problem of an imperfectly conducting mandrel. An imperfectly conducting mandrel may be regarded as having a finite, non-zero conductivity.

Itskovich '381 shows modeling results to illustrate the effectiveness of the electromagnetic and magnetostatic shielding. A two-layered formation as shown in FIG. 3 may be used for the modeling. The MWD tool 300 may be placed in a resistive upper half-space 315 with a resistivity $R_{01}$ of 50 Ω-m. Ahead of a drill bit 311, on the other side of a boundary 313 is a medium 320 with a resistivity $R_{02}$ of 1 Ω-m. The boundary may be at a distance (0-5 m) below the drill bit 311. The boundary 313 may be a bed boundary or may, for example, be a fluid interface between a hydrocarbon-saturated formation and a water-saturated formation.

Figure 4:
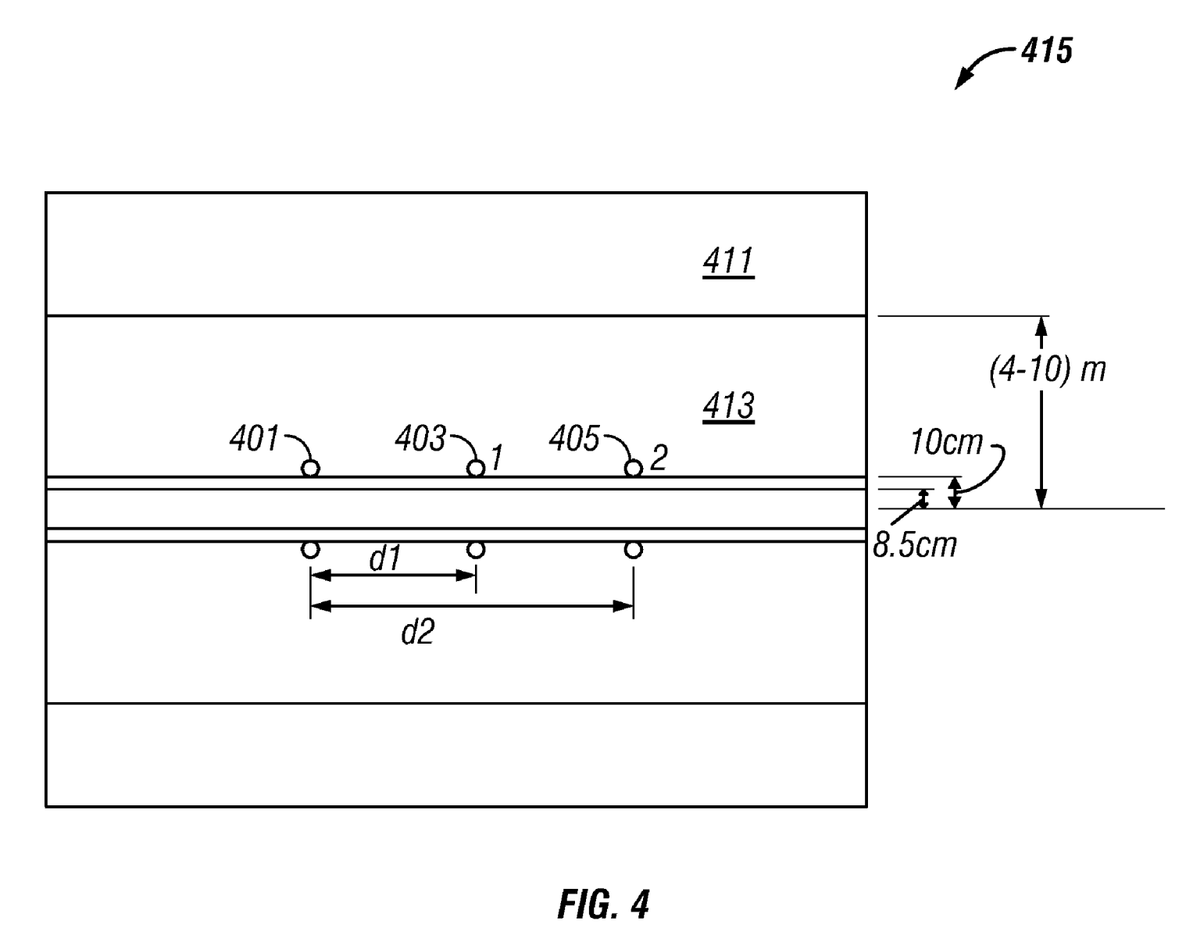
FIG. 4 shows the exemplary model used to illustrate the present disclosure.

FIG. 4 shows the exemplary tool configuration and model used to illustrate the present disclosure. The logging tool includes one transmitter and at least two receivers and allows effective bucking of the conductive drillstring in application to time domain electromagnetic measurements (TDEM), also referred to TEM. In the example shown in FIG. 4, a receiving coil is may be based either on one side from the transmitter or on different sides from a transmitter. Transmitter 401 and two receivers $R_1$, $R_2$ (403, 405) are shown in a borehole. The tool may include a 1.5 m long ferrite with μ=400, which is centered with respect to 0.5 m spacing. The formation consists of two cylindrical layers 411, 413 with resistivity 2 and 50 Ω-m. The system is placed in the resistive layer. The position of "water-oil" boundary 415 is varied between 4 m and 10 m for the modeling simulations. The drill collar has an outer radius of 10 cm and an inner channel with a radius of 6.5 cm.

In one embodiment of the disclosure, pulsed induction (TEM) measurements are made in the presence of the conductive drill collar (pipe) in a calibration mode in air. The two receivers $R_1$, $R_2$ measure signals $C_1(t)$ and $C_2(t)$ respectively. A time dependent gain coefficient given by:

$$K(t) = \frac{C_2(t)}{C_1(t)} \tag{1}$$

is calculated. Next, TEM measurements are made in the borehole and TEM measurements $S_1(t)$ and $S_2(t)$ are measured by the two receivers. A differential error signal ΔS(t) is estimated according to the equation:

$$\Delta S(t)=S_2(t)-K(t)S_1(t) \tag{2}$$

The differential error signal ΔS(t) is substantially unaffected by the pipe. Inversion of the differential signal provides parameters of the surrounding formation including resistivity, distance to an interface in the formation (geosteering) or ahead of the drill. For geosteering, the receiver coils should be placed asymmetrically with respect to the transmitter coil to avoid a zero differential error signal when the borehole is parallel to the interface. The interface may be a bed boundary and/or an interface between two fluids having different resistivity, such as an oil-water contact. The differential error signal here (using signals from two receivers) is different from the differential signal in U.S. Pat. No. 7,167,006 of Itskovich, the contents of which are incorporated herein by reference. In the Itskovich '006 patent, the calibration signal for each transmitter-receiver distance is simply subtracted from the corresponding measurement in the borehole.

Figure 5:
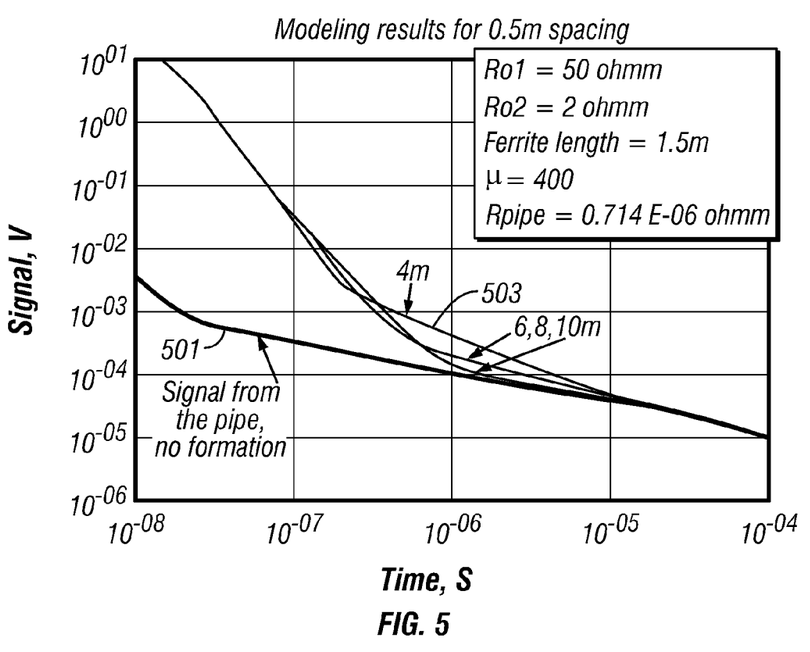
FIG. 5 shows a transient electromagnetic (TEM) response for different distances to an interface with a 0.5 m transmitter-receiver distance for the model of FIG. 4.
Figure 6:
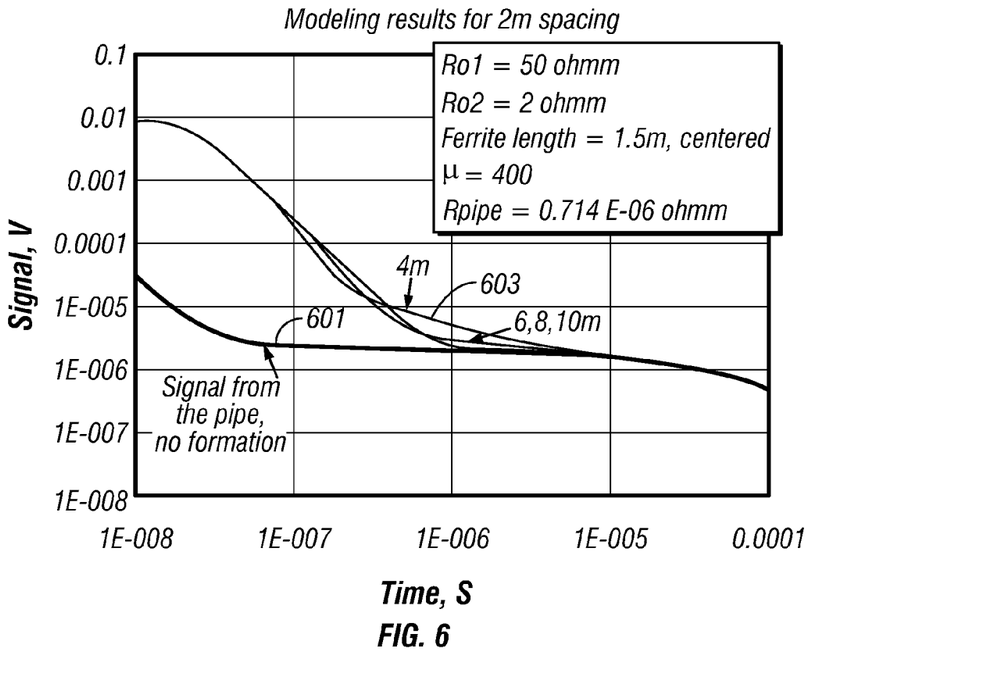
FIG. 6 shows a TEM response for different distances to an interface with a 2 m transmitter-receiver distance for the model of FIG. 4.

FIG. 5 shows the transient signals for a spacing of 0.5 m between the transmitter and a receiver. 501 shows the calibration signal while the set of curves 503 are for different distances to the interface. The abscissa is time and the ordinate is the signal amplitude. FIG. 6 shows comparable transient signals for a spacing of 2 m between the transmitter and a receiver. 601 shows the calibration signal while the set of curves 603 are for different distances to the interface. It can be seen from FIGS. 5 and 6 that for distances greater than 6 m, data at both transmitter-receiver distances is unable to resolve the distance.

Figure 7:
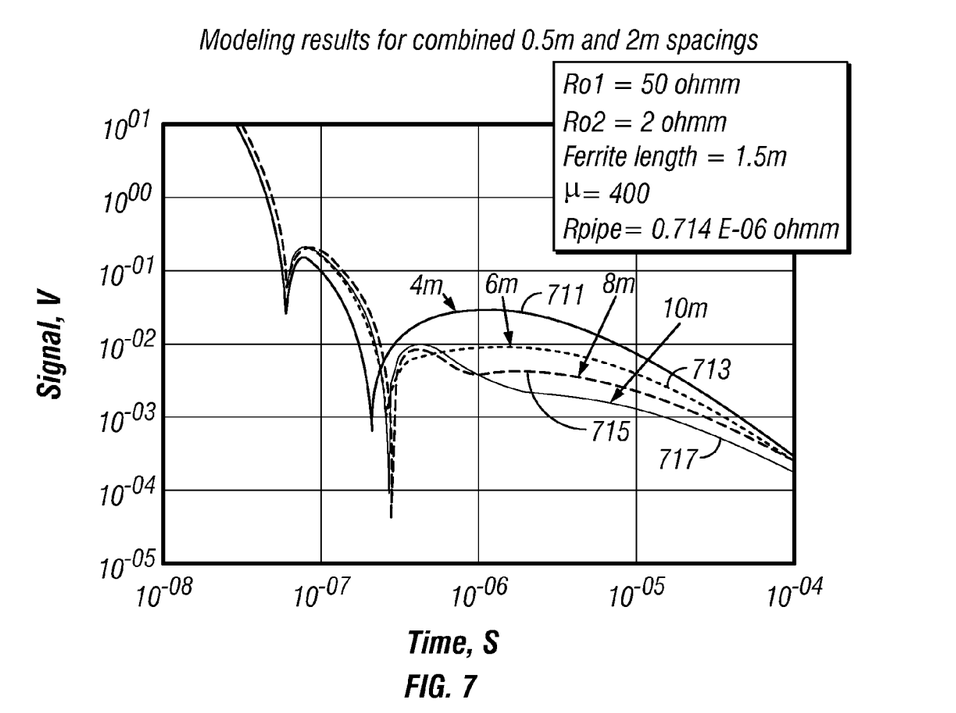
FIG. 7 shows the differential error signal for different distances to an interface obtained by combining the measurements of FIGS. 5 and 6.

Turning now to FIG. 7, the differential error signal for different distances to an interface obtained by combining the measurements of FIGS. 6 and 7 are shown. The response curves for 4 m, 6 m, 8 m and 10 m (711, 713, 715, 717) are clearly separable, so that inversion of this differential error signal can be used to estimate distances to interfaces in the formation.

In another embodiment of the disclosure, the bucking does not depend on using a time varying gain K(t). Instead, the magnetic moments $M_1$ and $M_2$ of the two receivers are matched with the corresponding transmitter-receiver spacings $d_1$ and $d_2$. These distances are shown in FIG. 4. Specifically, the moments are selected to satisfy the following condition:

$$\frac{M_1}{M_2} = \frac{d_1^3}{d_2^3}. \tag{3}$$

Eqn.(1) is well known in the induction measurements as the "bucking condition" of the primary signal. By subtracting signal $S_2$ measured at the distance $d_2$ from the signal $S_1$ measured at the distance $d_1$ we assure that in the absence of the formation the differential response (bucked signal) $\Delta S=S_2-S_1$ is small compared to the signal in the presence of the formation. In the other words, by performing bucking we pretend to receive a signal that might be interpreted based on the same formation model and no pipe in the system. This type of bucking has been used in conventional induction logging where the transmitter is activated at one or more selected frequencies and resistivity properties are estimate using amplitudes and/or phase shifts between transmitted and received signals, or between received signals.

By utilizing eqn.(3) for TEM measurements, we rely on the fact that the signal from the steel pipe in the absence of the formation is inversely proportional to a third power of the Transmitter/Receiver spacing. In practice, in order to substantially reduce the pipe effect on the transient signal, the eqn. (3) has to hold not in an arbitrary time range, but in the time window in which the signals are most responsive to parameters of the formation. Our modeling results indicate that for the task of geo-steering this time widow falls into the range of $(10^{-7}\text{-}10^{-5})$ s. By this reason in order to objectively estimate quality of our transient bucking system we have to compare a bucked transient response in the model with a pipe and formation versus a bucked transient response from the model with the formation and no pipe in the model. The closer those two responses in the indicated time range are the less error will be made by interpreting the bucked transient response as the response corresponding to the formation model with no pipe.

Figure 8:
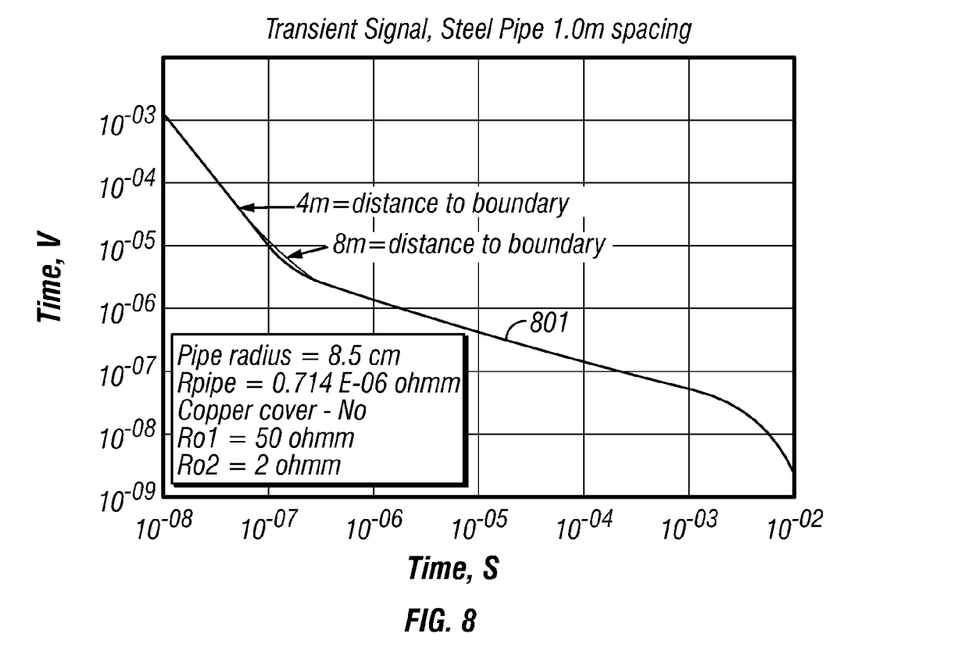
FIGS. 8-10 show transient responses in the presence of a steel pipe for transmitter-receiver spacings of 1, 2 and 4 m respectively.
Figure 9:
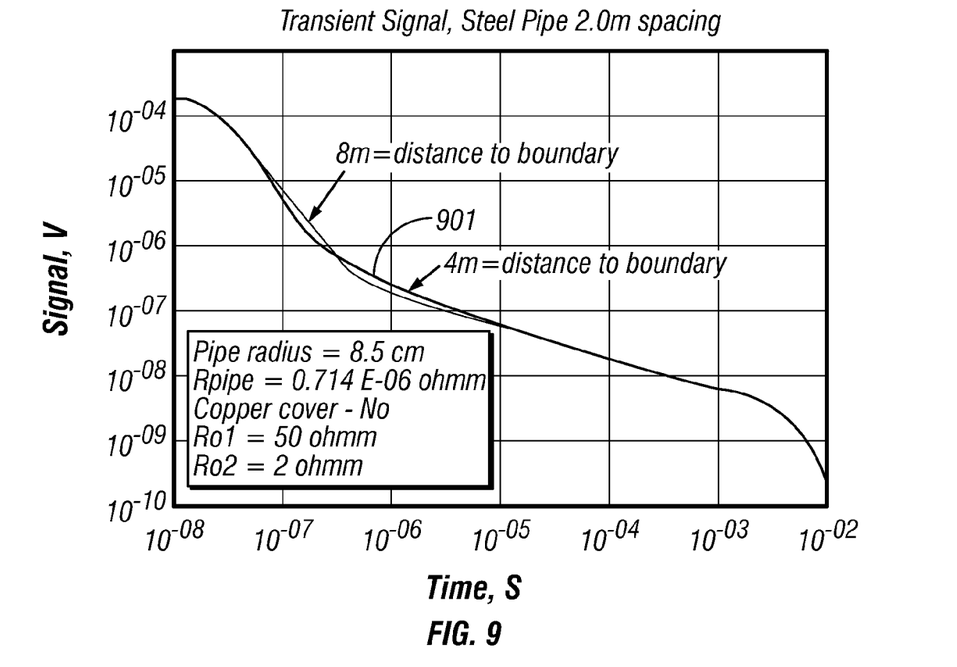
Figure 10:
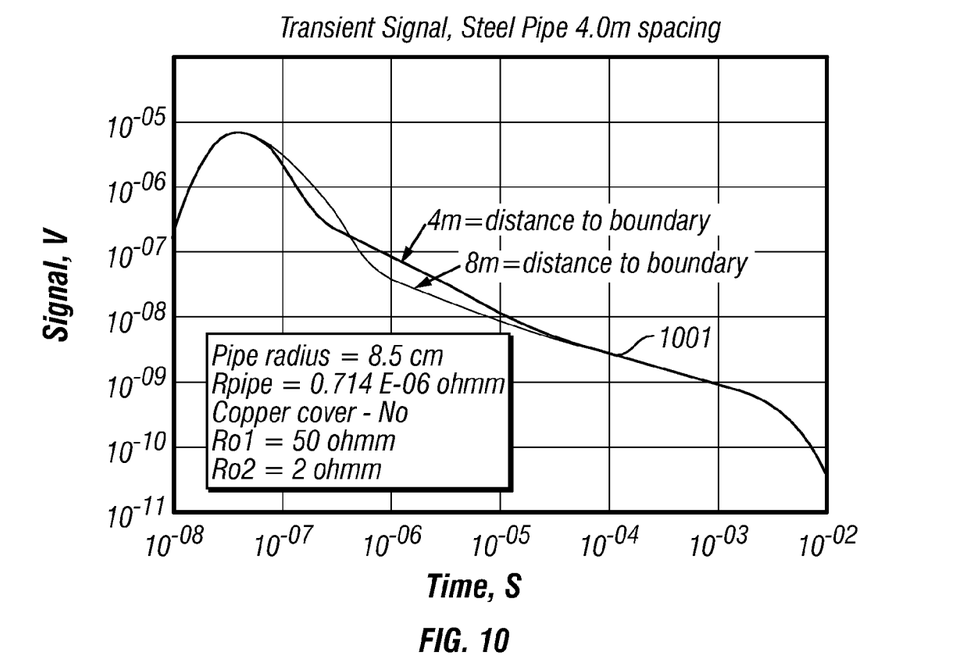
Figure 11:
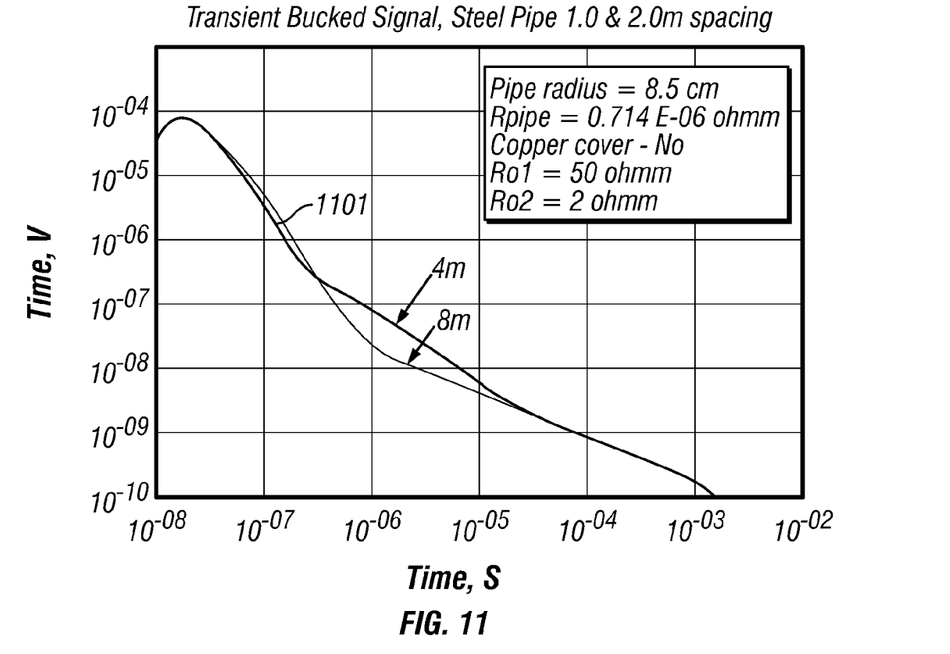
FIG. 11 shows the bucked transient response using measurements at 1 m and 2 m in the presence of a steel pipe.
Figure 12:
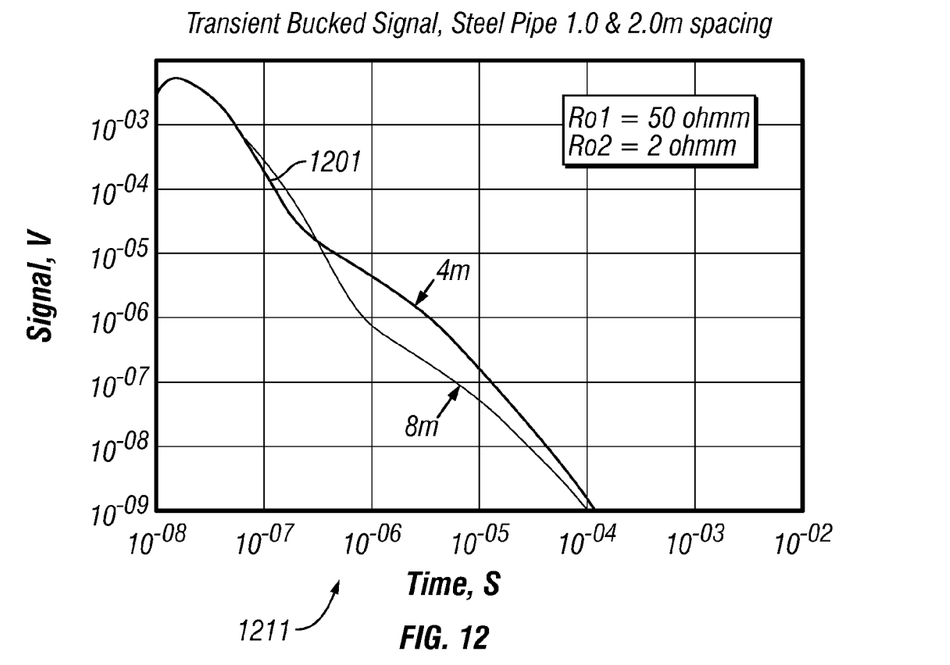
FIG. 12 shows the bucked transient response using measurements at 1 m and 2 m in the absence of a steel pipe.

What follows below is the proof of the described concept. The proof is based on the mathematical modeling of the bucked response for the case of some typical geo-electrical formation model consisting of two cylindrical layers with resistivity 2 and 50 $\Omega$-m. The transient Transmitter/Receivers system is placed at the distance either 4 of 8 m from the hypothetical interface (e.g., a "water-oil" boundary). By looking at the separation between two bucked transient curves corresponding to 4 and 8 m boundary position we can see the effectiveness of the bucking system, and ideally, this separation should be similar to the one that is observed in the case of the formation model with no pipe. First, in FIGS. 8-10 we present mathematical modeling results for the described model and two coil arrangements (no bucking yet!) when presence of the conductive steel pipe significantly deteriorates resolution of the transient signal with respect to the "water-oil" boundary. 801 in FIG. 8 is for a spacing of 1 m, 901 in FIG. 9 is for a spacing of 2 m, and 1001 in FIG. 10 is for a spacing of 4 m. It can be seen that the smaller the spacing is the smaller the sensitivity of the signal to the boundary of interest. Now we combine curves from FIG. 8 and FIG. 9 in accordance with eqn. (3) to synthesize bucked transient response for 1 and 2 m-spaced receivers. The result is presented in FIG. 11. Looking at bucked signal responses corresponding to the different position of water-oil boundary we can see that curves are much better resolved compared to unbucked system. In fact, the shape of the curves and separation between them quite similar to those that correspond to the model comprised of the same formation but has no steel pipe in the system (FIG. 12). It is noticeable, that similarity between curves from FIG. 11 and FIG. 12 deteriorates with time, especially when time bigger than 1 µs. See 1211 in FIG. 12. This is another confirmation of difficulty in detecting deeply placed water-oil boundary, since in this case information about boundary position can be extracted at late time only.

Figure 13:
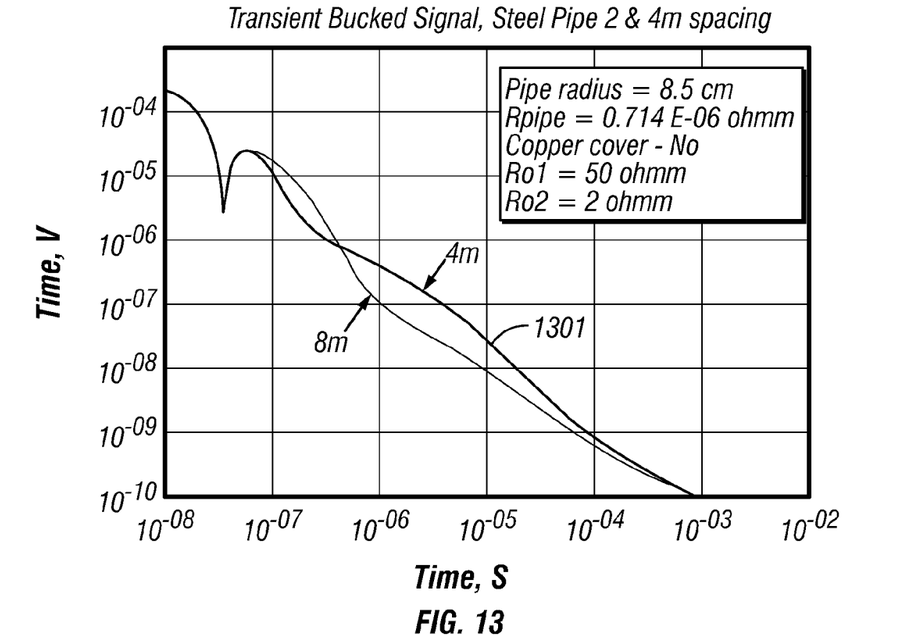
FIG. 13 shows the bucked transient response using measurements at 2 m and 4 m in the presence of a steel pipe.
Figure 14:
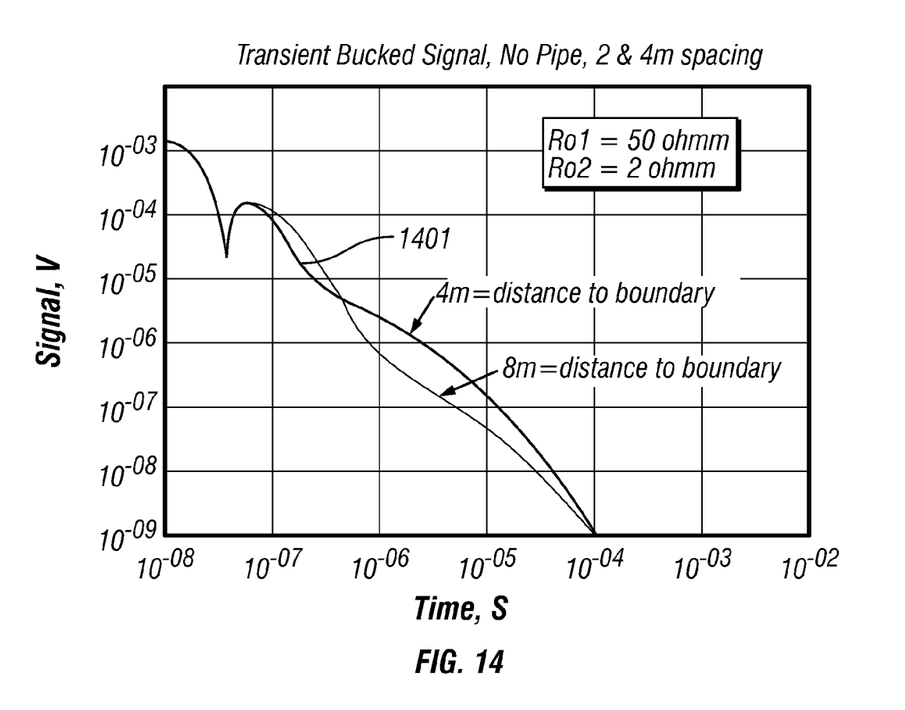
FIG. 14 shows the bucked transient response using measurements at 2 m and 4 m in the absence of a steel pipe.

Similarly, we combine curves from FIG. 9 and FIG. 10 in accordance with eqn. (3) to synthesize bucked transient response for 2 and 4 m-spaced receivers. The result is presented by 1301 in FIG. 13. By comparing bucked curves from FIG. 13 with the curves 1401 that correspond to the "no pipe" case (FIG. 14) we see a significant increase of the time window (to at least 5 µs) when similarity between the curves takes place. This clearly indicates that the bucked pair of coils with spacing 2 and 4 m is superior to the 1 and 2 m bucked pair.

In order to boost a resolution of transient system further a third embodiment that utilizes a combination of a three coil bucking system and copper shield. A copper shield is assumed to be covering whole space between transmitter and receivers (about 7 m long) and being thick enough (couple mm) to prevent penetration of eddy currents into the steel pipe. Further information about the copper shield may be found in Itskovich '381.

To prove an effectiveness of the copper shield we performed mathematical modeling of the bucked response for the system with copper shield surrounded by formation described earlier. Modeling is performed for the water-oil boundary placed at 8 m from the transient system, which represents more of a challenge than a model with the boundary at 4 m, since as was pointed out earlier the larger the distance to the boundary, the later is the time when this boundary can be detected.

Figure 15:
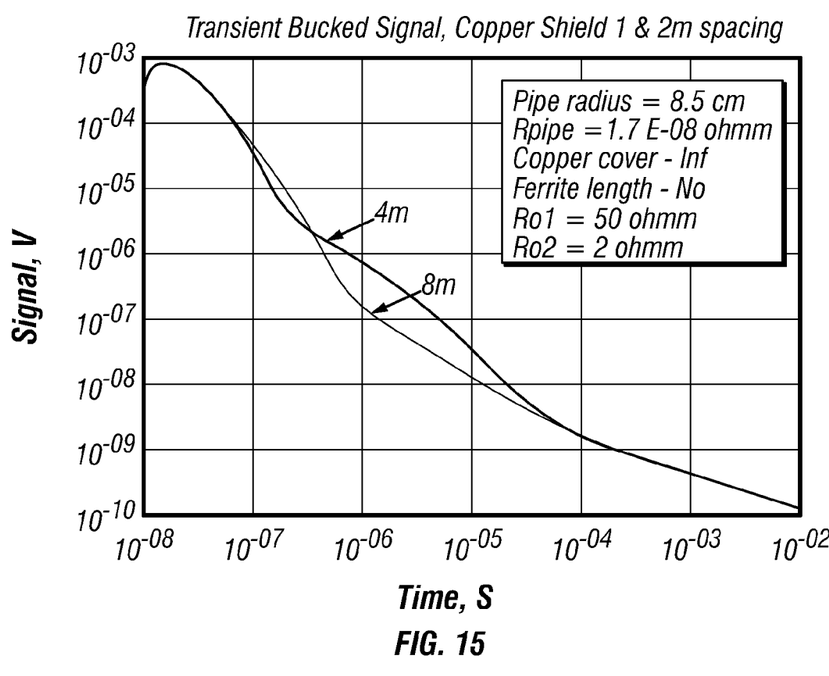
FIG. 15 shows the transient bucked signal with a copper shield and receiver spacings of 1 m and 2 m.
Figure 16:
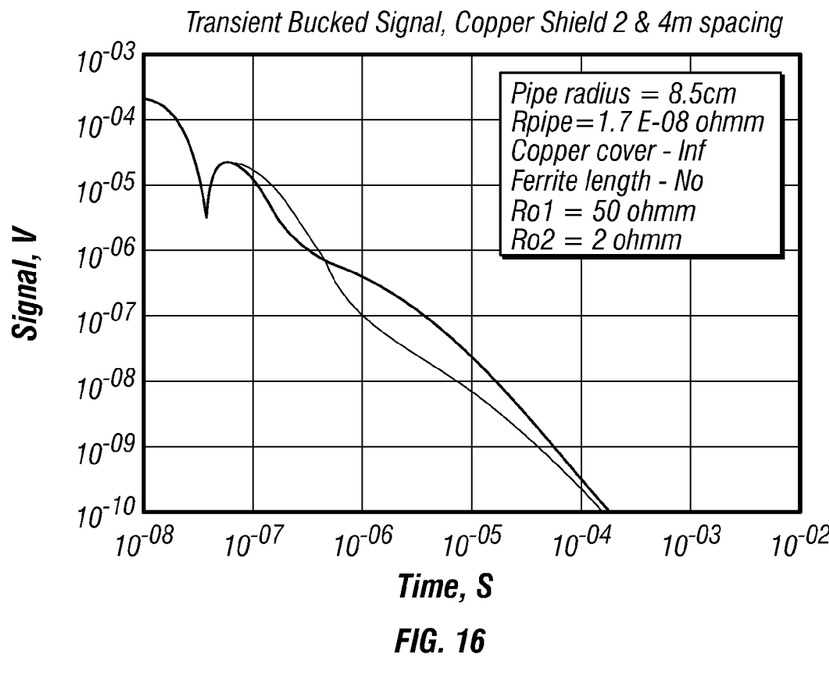
FIG. 16 shows the transient bucked signal with a copper shield and receiver spacings of 2 m and 4 m.

Results for 1 and 2 m-bucked receivers are presented in FIG. 15, while modeling results in case of 2 and 4 m-receiving pair are presented in FIG. 16. By comparing curves from FIG. 15 (or FIG. 16) with the corresponding curves from FIG. 12 (or FIG. 14) we can see that a presence of the copper shield in the system increases by a factor of several times a time window when bucked response behaves similar to a "no pipe" case.

Figure 17:
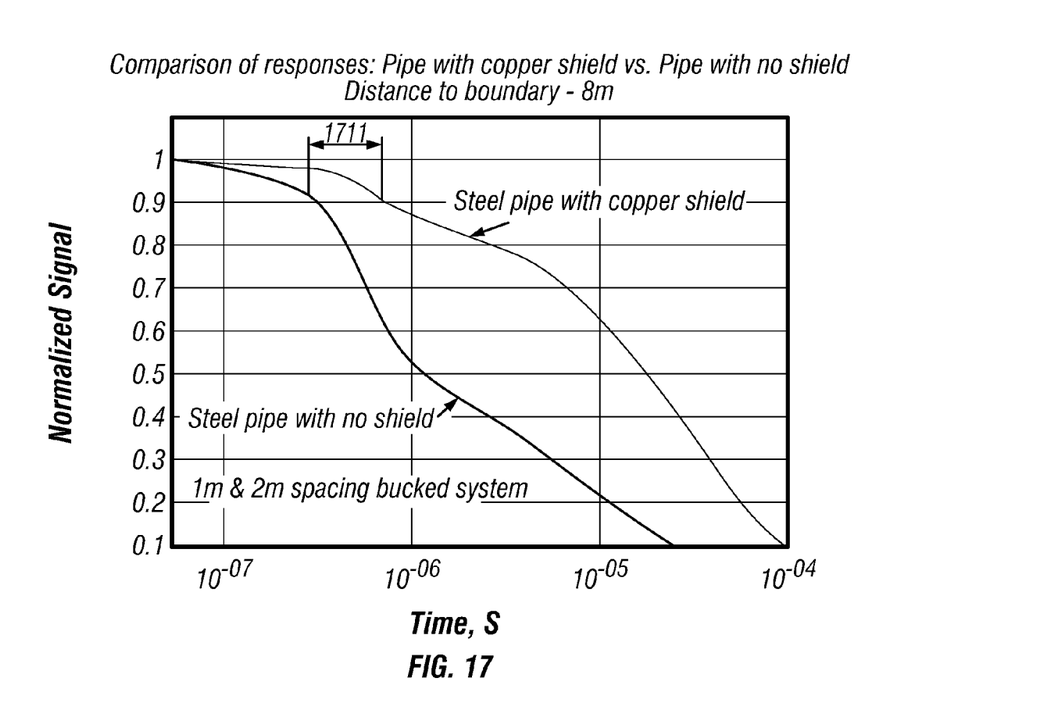
FIG. 17 shows a comparison of responses a signal using measurements and 1 m and 2 m with and without a copper shield for an interface at 8 m.
Figure 18:
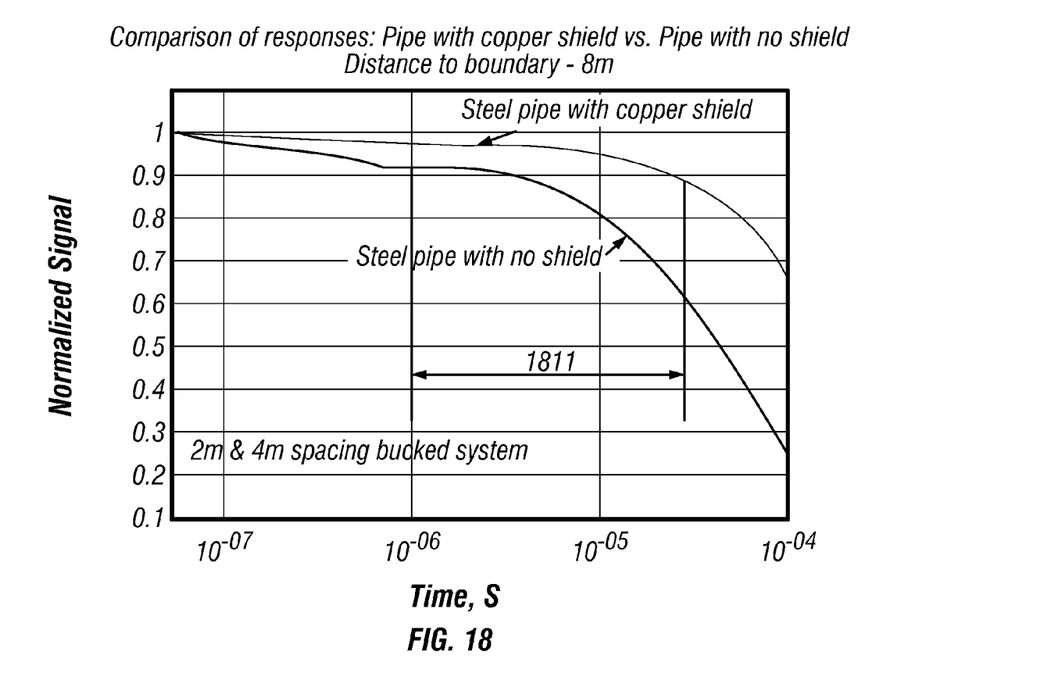
FIG. 18 shows a comparison of responses a signal using measurements and 2 m and 4 m with and without a copper shield for an interface at 8 m.

To quantify performance of two systems with and without copper shield we calculated normalized responses by dividing each system response by the response corresponding to the system that has no pipe. In this normalized notation a reading of 1 would indicate on identity of two responses. The results of calculations are presented in FIG. 17 and FIG. 18. As we can clearly observe from these figures a copper shield significantly increases a time range where model with a pipe is closer to the model with no pipe. Let us assume that a tolerable deviation of one response from another is 10%. Then for the short bucked system (FIG. 17) an increase of time range when normalized response exceeds reading of 0.9 is about factor 3 (see the change 1711), while for the long system (FIG. 18) is almost factor 10 (see the change 1811). This proves the value of a copper shielding.

The method of the present disclosure has been in terms of a bottomhole assembly conveyed on a drilling tubular. The method may also be practiced using devices on a logging string conveyed on a wireline. Collectively, the bottomhole assembly and a wireline-conveyed logging string may be referred to as downhole assemblies.

The processing of the data may be accomplished by a downhole processor or a surface processor. Implicit in the control and processing of the data is the use of a computer program implemented on a suitable machine-readable medium that enables the processor to perform the control and processing. The machine-readable medium may include ROMs, EPROMs, EAROMs, flash memories and/or optical disks.

While the foregoing disclosure is directed to various preferred embodiments of the present disclosure, various modifications will be apparent to those skilled in the art having the benefit of the present disclosure. It is intended that all such variations within the scope and spirit of the appended claims be embraced by the present disclosure.

What is claimed is:

1. A method of evaluating an earth formation, the method comprising:
   changing a current through a transmitter on an electromagnetic instrument in a borehole and inducing a current in the earth formation;
   receiving a first transient signal resulting from the induced current in a first receiver and a second transient signal in a second receiver on the instrument, the first transient signal and the second transient signal including effects of a conductive body of the instrument; and
   using the first transient signal and the second transient signal for estimating a distance to an interface in the earth formation, the estimating being substantially unaffected by the conductive body.

2. The method of claim 1 wherein estimating the distance further comprises using a gain factor derived from calibration measurements made by the first receiver and the second receiver.

3. The method of claim 2 further comprising making the calibration measurements with the instrument in a substantially homogenous medium.

4. The method of claim 1 wherein estimating the distance further comprises selecting magnetic moments of the first receiver and the second receiver as a function of a distance from the transmitter to the first receiver and a distance from the transmitter to the second receiver.

5. The method of claim 1 further comprising positioning a conductive shield on the instrument between the transmitter and the receivers.

6. The method of claim 1 further comprising using the instrument in a borehole wherein a longitudinal axis of the instrument is inclined at an angle of less than about 45° to the interface.

7. The method of claim 1 further comprising conveying the electromagnetic instrument is conveyed on a bottomhole assembly (BHA) into a borehole, the method further comprising using the determined distance for controlling a drilling direction of the BHA.

8. The method of claim 1 wherein the interface is selected from: (i) a bed boundary, and (ii) an interface between two fluids.

9. The apparatus of claim 1 further comprising a conductive shield on the instrument between the transmitter and the receivers, the conductive shield configured to reduce the effect of the conductive body on the first signal and the second signal.

10. An apparatus configured to evaluate an earth formation, the apparatus comprising:
    an electromagnetic instrument having a conductive body configured to be conveyed in a borehole;
    at least one processor configured to change a current in a transmitter on the instrument;
    a first receiver configured to receive a first transient signal resulting from current induced in the formation responsive to the change in current in the transmitter; and
    a second receiver configured to receive a second transient signal resulting from the induced current;
    wherein the first transient signal and the second transient signal include effects of the conductive body and wherein the at least one processor is further configured to estimate a distance to an interface in the earth formation, the estimation being substantially unaffected by the conductive body.

11. The apparatus of claim 10 wherein the at least one processor is further configured to estimate the distance by using a gain factor derived from calibration measurements made by the first receiver and the second receiver.

12. The apparatus of claim 11 wherein the at least one processor is further configured to use a gain factor derived from calibration measurements with the instrument in a substantially homogenous medium.

13. The apparatus of claim 10 wherein magnetic moments of the first receiver and the second receiver are selected as a function of a distance from the transmitter to the first receiver and a distance from the transmitter to the second receiver.

14. The apparatus of claim 10 wherein the electromagnetic instrument is configured to be conveyed on a bottomhole assembly (BHA) into a borehole, and wherein the at least one processor is further configured to use the determined distance for controlling a drilling direction of the BHA.

15. The apparatus of claim 10 wherein the interface is selected from: (i) a bed boundary, and (ii) an interface between two fluids.

16. A non-transitory computer-readable medium product having thereon instructions that when read by at least one processor, cause the at least one processor to perform a method, the method comprising:
    estimating a distance to an interface in an earth formation using:
    (i) a first transient signal in a first receiver resulting from an induced current in the earth formation produced by a transient signal in a transmitter on an electromagnetic instrument; and
    (ii) a second transient signal in a second receiver resulting from the induced current;
    wherein the first transient signal and the second transient signal including effects of a conductive body of the instrument and wherein the estimate is substantially unaffected by the conductive body.

17. The computer-readable medium of claim 16 further comprising at least one of: (i) a ROM, (ii) an EPROM, (iii) an EAROM, (iv) a flash memory, or (v) an optical disk.

* * * * *